United States Patent
Anzai

(10) Patent No.: US 11,557,963 B2
(45) Date of Patent: Jan. 17, 2023

(54) CHARGE-PUMP CONTROL CIRCUIT AND BATTERY CONTROL CIRCUIT

(71) Applicant: ABLIC Inc., Tokyo (JP)

(72) Inventor: Ryoichi Anzai, Tokyo (JP)

(73) Assignee: ABLIC INC., Tokyo (JP)

( * ) Notice: Subject to any disclaimer, the term of this patent is extended or adjusted under 35 U.S.C. 154(b) by 226 days.

(21) Appl. No.: 16/897,636

(22) Filed: Jun. 10, 2020

(65) Prior Publication Data
US 2020/0395846 A1  Dec. 17, 2020

(30) Foreign Application Priority Data
Jun. 14, 2019 (JP) .............................. JP2019-110750

(51) Int. Cl.
*H02M 3/07* (2006.01)
*H02J 7/00* (2006.01)

(52) U.S. Cl.
CPC .............. *H02M 3/07* (2013.01); *H02J 7/007* (2013.01); *H02J 2207/20* (2020.01)

(58) Field of Classification Search
CPC .... H02M 3/07; H02J 7/00; H02J 7/007; H02J 2207/20
USPC ........................................................ 320/128
See application file for complete search history.

(56) References Cited

U.S. PATENT DOCUMENTS

| 2009/0128212 A1* | 5/2009 | Liu ................ H02M 3/07 327/291 |
| 2011/0109376 A1* | 5/2011 | Li ................. H02M 3/073 327/536 |
| 2020/0099229 A1* | 3/2020 | Jeong .............. H02J 7/007 |

FOREIGN PATENT DOCUMENTS

| JP | 2012135197 A | * 7/2012 | ............ H02M 3/073 |
| JP | 6018749 B2 | 10/2016 | |

* cited by examiner

*Primary Examiner* — Richard Isla
*Assistant Examiner* — Dung V Bui
(74) *Attorney, Agent, or Firm* — Crowell & Moring LLP

(57) ABSTRACT

A charge-pump control circuit includes an oscillator which supplies a clock for driving a charge pump driver to supply a first gate voltage to a discharging transistor in order to control discharge from a battery, and driving a charge pump driver to supply a second gate voltage to a charging transistor in order to control charge to the battery, respectively; and a drive control circuit which sets a control target voltage as one of the first gate voltage and the second gate voltage having a lower voltage in order to control generation of the clock by the oscillator according to the control target voltage.

4 Claims, 9 Drawing Sheets

CHARGE-PUMP CONTROL CIRCUIT AND BATTERY CONTROL CIRCUIT

RELATED APPLICATIONS

This application claims priority to Japanese Patent Application No. 2019-110750, filed on Jun. 14, 2019, the entire content of which is incorporated herein by reference.

BACKGROUND OF THE INVENTION

1. Field of the Invention

The present invention relates to a charge-pump control circuit and a battery control circuit.

2. Description of the Related Art

Conventionally, a battery device is attached to a mobile device as a power supply during mobile operation.

In the battery device, a rechargeable battery capable of obtaining a desired battery voltage and a battery control circuit which performs charge/discharge control on this battery are incorporated.

FIG. 9 is a circuit diagram illustrating a battery device including a conventional battery control circuit. A battery device 1100 is composed of a battery 242 and a battery control device 1200. When the connected device 930 is a charger, the battery control device 1200 supplies a charging current from the charger to the battery 242, while when the connected device 930 is a load, the drive current (discharging current) is supplied from the battery 242 to the load.

In FIG. 9, each of a charging transistor 216 and a discharging transistor 218 is an n-channel MOS transistor.

In this case, there is a need to boost the gate voltage so that the gate-source voltage Vgs of each of the charging transistor 216 and the discharging transistor 218 exceeds the threshold voltage Vth to reduce the channel resistance.

The battery control device 1200 hence includes a charge-pump control circuit 1300 which controls each of charge pump circuits 910 and 1110.

The charge pump circuit 910 boosts the gate voltage of the discharging transistor 218, and the charge pump circuit 1110 boosts the gate voltage of the charging transistor 216.

A V/I conversion circuit 1130 converts the gate voltage of the charging transistor 216 into a sense current and outputs the sense current to an oscillator 906 through the transistor 1106.

A conversion circuit 904 converts the gate voltage of the discharging transistor 218 into a sense current and outputs the sense current to the oscillator 906 through the transistor 1106.

The oscillator 906 adjusts the clock frequency to drive each of the charge pump circuits 910, 1110 according to a current obtained by combining the respective sense currents of the V/I conversion circuits 904 and 1130 to keep the gate voltage of each of the charging transistor 216 and the discharging transistor 218 at a predetermined voltage.

The gate voltage of each of the charging transistor 216 and the discharging transistor 218 is hence kept at the predetermined voltage equal to or larger than the threshold value during normal operation of charging and discharging of the battery 242.

Further, a protective element (not illustrated) is typically provided between the source and gate of each of the charging transistor 216 and the discharging transistor 218 to prevent dielectric breakdown due to an excessive rise in gate voltage.

However, in Japanese Patent No. 6018749, although the impedances of the respective protective elements of the charging transistor 216 and the discharging transistor 218 need to be the same, a process variation generally occurs and makes the impedances different.

On the other hand, since the respective sense currents of the charging transistor 216 and the discharging transistor 218 are combined to generate a clock frequency oscillating by the combined current, the oscillator 906 oscillates for the clock having a frequency corresponding to the averaged sense current.

Hence the gate voltage of each of the charging transistor 216 and the discharging transistor 218 does not become a voltage which was set previously according to the clock frequency.

In other words, in one of the charging transistor 216 and the discharging transistor 218 whose protective element has a lower impedance, the gate voltage becomes lower than the predetermined voltage to make the channel resistance higher than desired or to turn off the transistor, inhibiting the supply of a necessary charging current or discharging current.

SUMMARY OF THE INVENTION

It is an object of the present invention to provide a charge-pump control circuit and a battery control circuit in which driving of charge pump circuit is controlled so that, even if the impedance of protective element provided at the gate of a charging transistor is different from that of a discharging transistor, the gate voltage of the transistor whose protective element has a lower impedance becomes a predetermined voltage.

A charge-pump control circuit according to an embodiment of the present invention includes a first charge pump driver which supplies a first gate voltage to a discharging transistor in order to control discharging from a battery, a second charge pump driver which supplies a second gate voltage to a charging transistor in order to control charging to the battery, an oscillator which supplies a clock for driving the first charge pump and the second charge pump, respectively; and a drive control circuit which sets a control target voltage as one of the first gate voltage and the second gate voltage having a lower voltage and controls generation of the clock by the oscillator according to the control target voltage.

A battery control circuit according to an embodiment of the present invention includes a discharging transistor which controls discharging from a battery; a charging transistor which controls charging to the battery; a first voltage conversion circuit which acquires a first gate voltage of the discharging transistor as a first detection voltage corresponding to the first gate voltage; a second voltage conversion circuit which acquires a second gate voltage of the charging transistor as a second detection voltage corresponding to the second gate voltage; a discharging charge-pump driver which supplies the first gate voltage to the discharging transistor; a charging charge-pump driver which supplies the second gate voltage to the charging transistor; an oscillator which supplies a clock for driving each of the discharging charge-pump driver and the charging charge-pump driver; and a drive control circuit which sets a control target voltage as one of the first gate voltage and the second gate voltage having a lower voltage and controls generation of the clock by the oscillator according to the control target voltage.

According to the present invention, there can be provided a charge-pump control circuit and a battery control circuit in which driving of charge pump circuits are controlled so that, even if the impedance of protective element provided at the gates of a charging transistor is different from that of a discharging transistor, the gate voltage of the transistor whose protective element has a lower impedance becomes a predetermined voltage.

DETAILED DESCRIPTION OF THE PREFERRED EMBODIMENTS

Embodiments of the present invention will be described below with reference to the accompanying drawings.

First Embodiment

Figure 1:
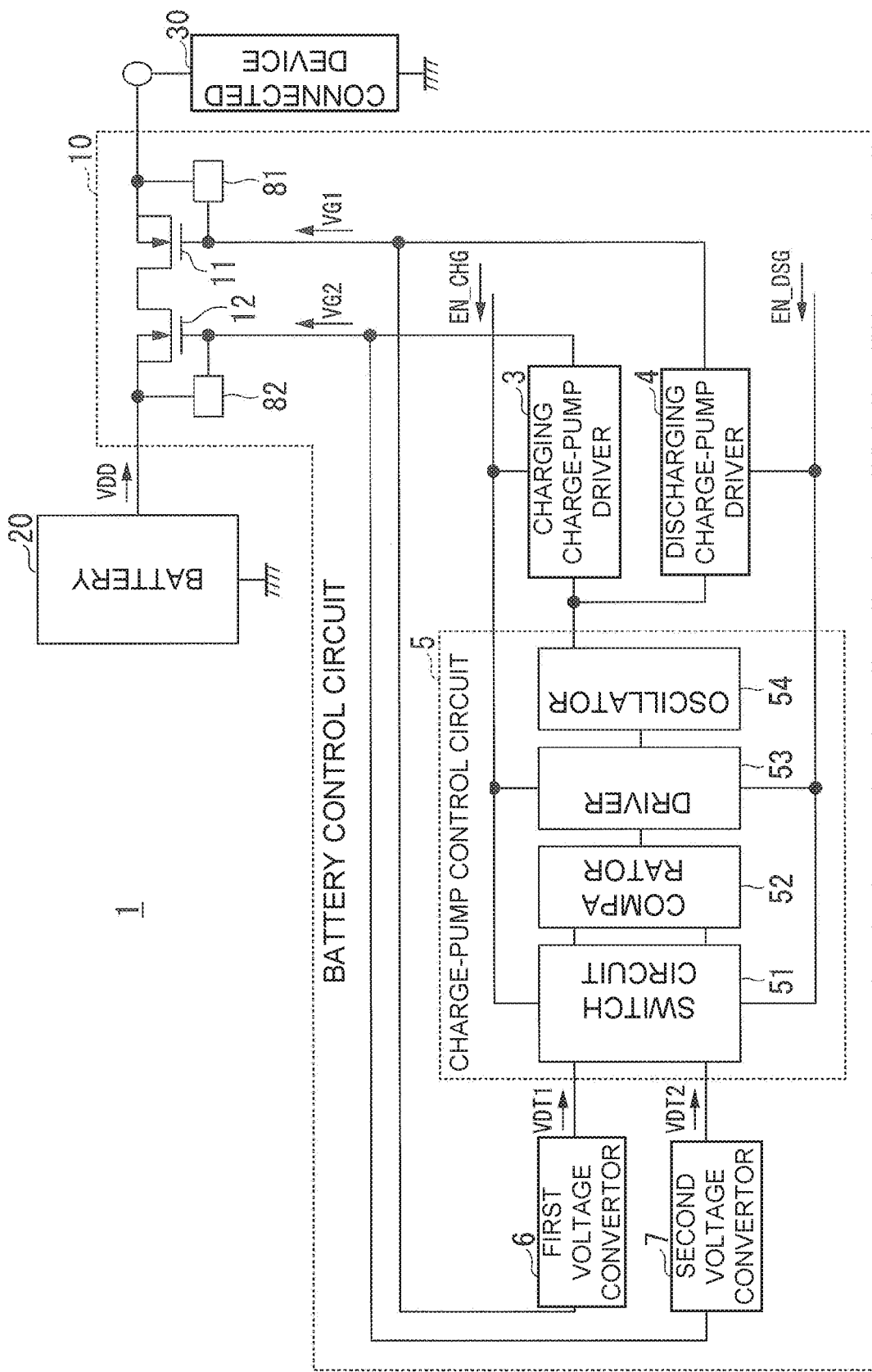
FIG. 1 is a schematic block diagram illustrating a configuration example of a battery device using a charge-pump control circuit according to a first embodiment.

FIG. 1 is a schematic block diagram illustrating a configuration example of a battery device using a charge-pump control circuit according to the first embodiment.

In FIG. 1, a battery device 1 includes a battery control circuit 10 and a battery 20. The battery control circuit 10 includes a discharging transistor 11, a charging transistor 12, a charging charge-pump driver 3, a discharging charge-pump driver 4, a charge-pump control circuit 5, a first voltage conversion circuit 6, and a second voltage conversion circuit 7. The charge-pump control circuit 5 has a switch circuit 51, a comparison circuit 52, a drive circuit 53, and an oscillator 54. The switch circuit 51, the comparison circuit 52, and the drive circuit 53 constitute a drive control circuit which controls the generation of a clock by the oscillator 54.

The discharging transistor 11 is an n-channel MOS transistor having a source connected to a positive terminal of a connected device 30, a gate connected to an output terminal of the discharging charge-pump driver 4 and an input terminal of the first voltage conversion circuit 6, and a drain connected to the drain of the charging transistor 12. A protective element 81 is provided between the source and the gate of the discharging transistor 11.

The charging transistor 12 is an n-channel MOS transistor having a source connected to a positive terminal of the battery 20, a gate connected to an output terminal of the charging charge-pump driver 3 and the input terminal of the first voltage conversion circuit 6, and a drain connected to the drain of the second voltage conversion circuit 7. A protective element 82 is provided between the source and the gate of the charging transistor 12.

The charge-pump control circuit 5 has a first input terminal connected to an output of the first voltage conversion circuit 6, a second input terminal connected to an output terminal of the second voltage conversion circuit 7, and an output terminal connected to input terminals of the charging charge-pump driver 3 and the discharging charge-pump driver 4. The charging charge-pump driver 3 has the output terminal connected to the gate of the charging transistor 12. The discharging charge-pump driver 4 has the output terminal connected to the gate of the discharging transistor 11.

In the case of enabled state of the charge enable signal EN_CHG, the charging charge-pump driver 3 boosts the gate voltage VG2 of the charging transistor 12 from the power supply voltage VDD to a predetermined voltage in response to the supplied clock. On the other hand, in the case of disabled state of the charge enable signal EN_CHG, the charging charge-pump driver 3 stops the boost operation.

In the case of enabled state of the discharge enable signal EN_DSG, the discharging charge-pump driver 4 boosts a gate voltage VG1 of the discharging transistor 11 from the power supply voltage VDD to the predetermined voltage in response to the supplied clock. On the other hand, in the case of disabled state of the discharge enable signal EN_DSG, the discharging charge-pump driver 4 stops the boost operation.

The charge enable signal EN_CHG described above is put in enabled state in the case where the power supply voltage VDD is less than the overcharge voltage, and put in disabled state in the case where the supply voltage VDD is equal to or higher than the overcharge voltage.

The discharge enable signal EN_DSG is put in disabled state in the case where the power supply voltage VDD is lower than or equal to an over-discharge voltage, and put in enabled state in the case where the power supply voltage VDD exceeds the over-discharge voltage.

The charge enable signal EN_CHG and the discharge enable signal EN_DSG are controlled by the monitoring control circuit (not illustrated) which monitors the power supply voltage VDD of the battery 20.

The first voltage conversion circuit 6 divides the supplied gate voltage VG1 of the discharging transistor 11 at a predetermined ratio, and outputs a first detection voltage VDT1 corresponding to the gate voltage VG1.

The second voltage conversion circuit 7 divides the supplied gate voltage VG2 of the charging transistor 12 at the predetermined ratio, and outputs a second detection voltage VDT2 corresponding to the gate voltage VG2.

The charge-pump control circuit 5 performs control as to whether to apply or not a clock to the charging charge-pump driver 3 and the discharging charge-pump driver 4 in response to one of the supplied first detection voltage VDT1 and second detection voltage VDT2 having a lower voltage.

In the case of enabled state of the discharge enable signal EN_DSG, the switch circuit 51 outputs the first detection voltage VDT1 to the comparison circuit 52 as the first comparison voltage. On the other hand, in the case of disabled state of the discharge enable signal EN_DSG, the switch circuit 51 outputs the power supply voltage VDD to the comparison circuit 52 as the first comparison voltage.

Further, in the case of enabled state of the charge enable signal EN_CHG, the switch circuit 51 outputs the second detection voltage VDT2 to the comparison circuit 52 as the second comparison voltage. On the other hand, in the case of disabled state of the charge enable signal EN_CHG, the switch circuit 51 outputs the power supply voltage VDD to the comparison circuit 52 as the second comparison voltage.

The comparison circuit 52 compares each of the first comparison voltage and the second comparison voltage with the reference voltage Vref. Here, in the case where a lower one of the first comparison voltage and the second comparison voltage is less than the reference voltage Vref, the comparison circuit 52 puts a drive enable signal in enabled state and outputs the drive enable signal to the drive circuit 53. On the other hand, in the case where a lower one of the first comparison voltage and the second comparison voltage is equal to or higher than the reference voltage Vref, the comparison circuit 52 puts the drive enable signal in disabled state and outputs the drive enable signal to the drive circuit 53.

In the case where either one of the discharge enable signal EN_DSG and the charge enable signal EN_CHG is in enabled state and the drive enable signal is in enabled state, the drive circuit 53 outputs a drive signal in drive state.

The oscillator 54 generates a clock at a predetermined frequency and supplies the clock to the charging charge-pump driver 3 and the discharging charge-pump driver 4.

Figure 2:
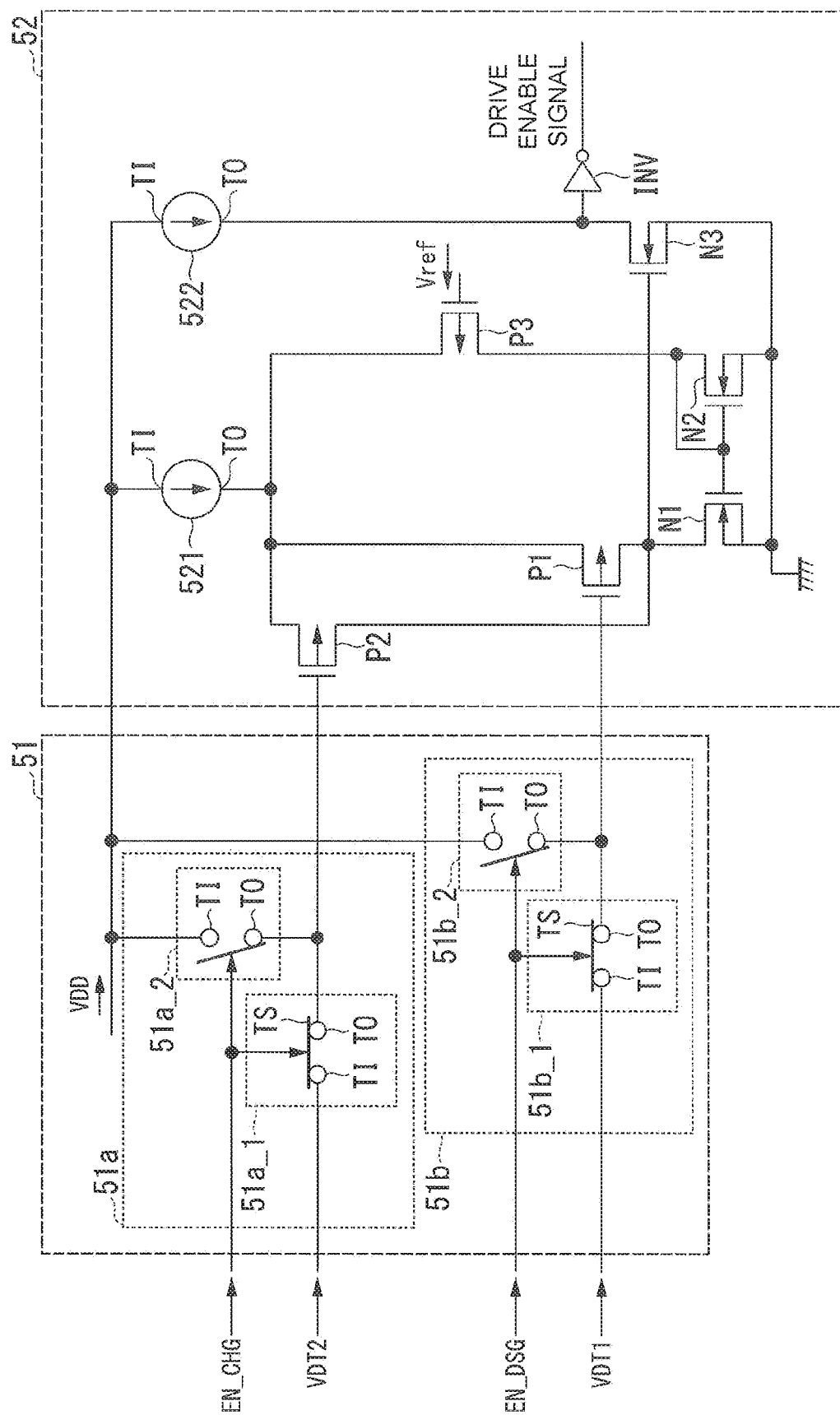
FIG. 2 is a circuit diagram illustrating a configurational example of a switch circuit 51 and a comparison circuit 52 in the first embodiment.

FIG. 2 is a circuit diagram illustrating a configurational example of the switch circuit 51 and the comparison circuit 52 in the first embodiment.

The switch circuit 51 includes switch circuits 51a and 51b. The switch circuit 51a has switches 51a_1 and 51a_2. The switch circuit 51b has switches 51b_1 and 51b_2.

Each of the switches 51a_1 and 51a_2 has a control terminal TS to which a signal line of the charge enable signal EN_CHG is connected, respectively.

Further, the switch 51a_1 has an input terminal TI to which a signal line of the second detection voltage VDT2 is connected, and an output terminal TO to which a signal line of the second comparison voltage is connected. The switch 51a_2 has an input terminal TI to which a power line of the power supply voltage VDD is connected, and an output terminal TO to which the signal line of the second comparison voltage is connected.

In this configuration, in the case of the enabled state of the charge enable signal EN_CHG, the switch circuit 51a outputs the second detection voltage VDT2 to the comparison circuit 52 as the second comparison voltage since the switch 51a_1 is in ON state and the switch 51a_2 is in OFF state. On the other hand, in the case of the disabled state of the charge enable signal EN_CHG, the switch circuit 51a outputs the power supply voltage VDD to the comparison circuit 52 as the second comparison voltage since the switch 51a_1 is in OFF state and the switch 51a_2 is in ON state.

The switches 51b_1 and 51b_2 have respective control terminals TS to which a signal line of the discharge enable signal EN_DSG is connected, respectively.

Further, the switch 51b_1 has an input terminal TI to which a signal line of the first detection voltage VDT1 is connected, and an output terminal TO to which a signal line of the first comparison voltage is connected. The switch 51b_2 has an input terminal TI to which the power line of the power supply voltage VDD is connected, and an output terminal TO to which the signal line of the first comparison voltage is connected.

In this configuration, in the case of enabled state of the discharge enable signal EN_DSG, the switch circuit 51b outputs the first detection voltage VDT1 to the comparison circuit 52 as the first comparison voltage since the switch 51b_1 is in ON state and the switch 51b_2 is in OFF state. On the other hand, in the case of disabled state of the discharge enable signal EN_DSG, the switch circuit 51b outputs the power supply voltage VDD to the comparison circuit 52 as the second comparison voltage since the switch 51b_1 is in OFF state and the switch 51b_2 is in ON state.

The comparison circuit 52 includes constant current sources 521, 522, transistors P1, P2, P3, N1, N2, N3, and a NOT circuit INV.

The transistors P1, P2 and P3 are p-channel MOS transistors, and transistors N1, N2 and N3 are n-channel MOS transistors.

The constant current source 521 has an input terminal TI connected to the power line of the power supply voltage VDD, and an output terminal TO connected to the sources of the transistors P1, P2 and P3.

The constant current source 522 has an input terminal TI connected to the power line of the power supply voltage VDD, and an output terminal TO connected to the drain of the transistor N3.

The transistor P1 has a gate connected to the signal line of the first comparison voltage and a drain connected to the drain of the transistor N1.

The transistor P2 has a gate connected to the signal line of the second comparison voltage and a drain connected to the drain of the transistor N1.

The transistor P3 has a gate to which the reference voltage Vref is applied, and a drain connected to the drain and gate of the transistor N2.

The transistor N1 has a gate connected to the drain and gate of the transistor N2 and a source connected to a power line of the power supply voltage VSS (ground voltage).

The source of the transistor N2 is connected to the power line of the power supply voltage VSS.

These transistors N1 and N2 constitute a current mirror circuit.

The transistor N3 has a drain connected to an input terminal of the NOT circuit INV, a gate connected to the drain of the transistor N1, and a source connected to the power line of the power supply voltage VSS.

An output terminal of the NOT circuit INV is connected to a signal line of the drive enable signal.

The comparison circuit 52 having the configuration described above compares a lower one of the first comparison voltage and the second comparison voltage with the reference voltage Vref, and outputs the drive enable signal in enabled state (for example, "H" level) in the case where the voltage is less than the reference voltage Vref, or outputs the drive enable signal in disabled state (for example, "L" level) in the case where the voltage is equal to or higher than the reference voltage Vref.

Figure 3:
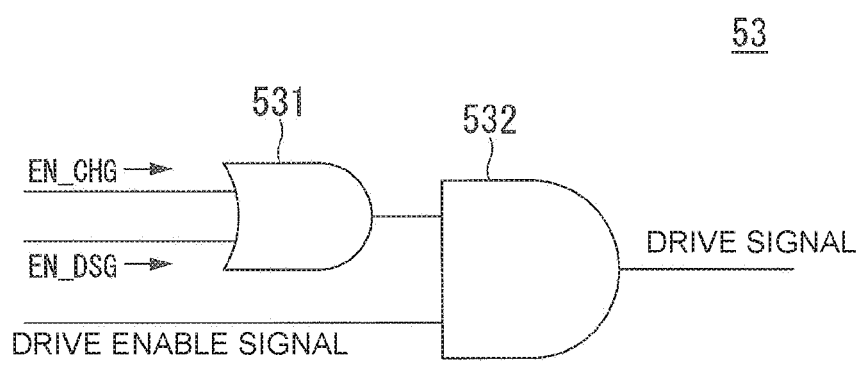
FIG. 3 is a circuit diagram illustrating a configurational example of a drive circuit 53 in the first embodiment.

FIG. 3 is a circuit diagram illustrating a configurational example of the drive circuit 53 in the first embodiment. The drive circuit 53 includes an OR circuit 531 and an AND circuit 532.

In the case where either one of the discharge enable signal EN_DSG and charge enable signal EN_CHG is "H" level, the OR circuit 531 outputs "H" level.

In the case where the output of the OR circuit 531 is "H" level and the drive enable signal is "H" level, the AND circuit 532 outputs "H" level drive signal indicative of the drive state.

Figure 4:
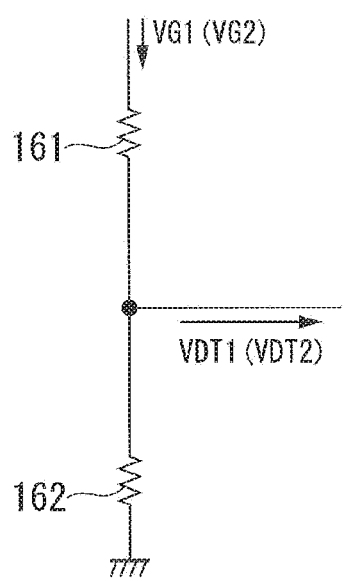
FIG. 4 is a circuit diagram illustrating configurational example of a first voltage conversion circuit 6 in the first embodiment.

FIG. 4 is a circuit diagram illustrating a configurational example of the first voltage conversion circuit 6 in the first embodiment. The first voltage conversion circuit 6 is so constructed that resistors 161 and 162 are connected in series between the signal line of the gate voltage VG1 and the power line of the power supply voltage VSS. Suppose that the resistor 161 has a resistance Ra and the resistor 162 has a resistance Rh, the first detection voltage VDT1 is expressed by Equation (1) below.

$$VDT1=(Rb/(Ra+Rb))VG1 \qquad (1)$$

Here, the first detection voltage VDT1 varies proportionally to the gate voltage VG1 by the resistance ratio Rb/(Ra+Rb).

The second voltage conversion circuit 7 has the same configuration as the first voltage conversion circuit 6 illustrated in FIG. 4.

As described above, according to the first embodiment, necessary charging current and discharging current can be supplied since the charging charge-pump driver 3 and the discharging charge-pump driver 4 operate to make the gate voltage of one of the discharging transistor 11 and the charging transistor 12 which has a lower impedance protective element between the protective elements 81 and 82 exceed the threshold voltage.

Further, according to the first embodiment, even if both the gate voltage VG1 of the discharging transistor 12 and the gate voltage VG2 of the charging transistor 12 exceed the threshold voltage, the oscillator 54 stops the clock generation, permitting realization of a power-saving charge-pump control circuit.

Second Embodiment

A battery device according to the second embodiment has the same configuration as the configuration of the first embodiment except for the first voltage conversion circuit 6 and the second voltage conversion circuit 7.

Figure 5:
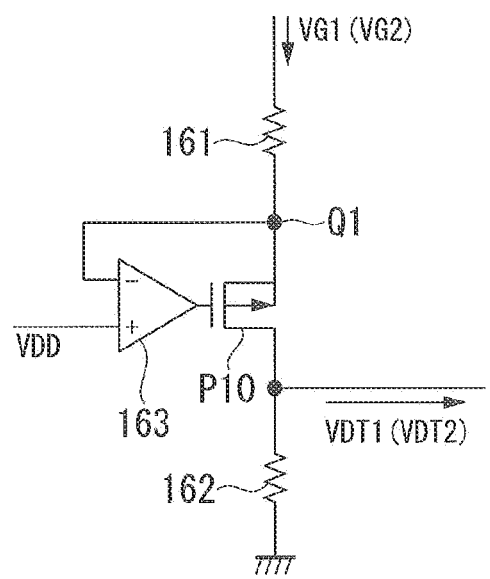
FIG. 5 is a circuit diagram illustrating a configurational example of a first voltage conversion circuit 6A in a second embodiment.

FIG. 5 is a circuit diagram illustrating a configurational example of the first voltage conversion circuit 6A in the second embodiment. Note that the configuration of the second voltage conversion circuit 7A is the same as that of the first voltage conversion circuit 6A illustrated in FIG. 5.

The first voltage conversion circuit 6A includes resistors 161, 162, an amplifier 163, and a transistor P10. The transistor P10 is a p-channel MOS transistor.

The resistor 161 has one end connected to the signal line of the gate voltage VG1 and the other end connected to the source of the transistor P10 and an inverting input terminal (−) of the amplifier 163 through a connection point Q1.

The resistor 162 has one end connected to the drain of the transistor P10 and the output terminal, and the other end connected to the power line of the power supply voltage VSS.

The amplifier 163 has a non-inverting input terminal (+) to which a predetermined voltage (for example, the power supply voltage VDD of the battery 20 or the voltage at the positive terminal of the connected device 30) is supplied, an inverting input terminal (−) connected to the other end of the resistor 161 and the source of the transistor P10, and an output terminal connected to the gate of the transistor P10.

The transistor P10 has a source connected to the other end of the resistor 162 and the inverting input terminal (−) of the amplifier 163, a gate connected to the output terminal of the amplifier 163, and a drain connected to one end of the resistor 162.

Since the amplifier 163 and the transistor P10 constitute a feedback circuit, the voltage at the connection point Q1 becomes equal to the power supply voltage VDD. Thereby current I1 flows through the resistor 161 corresponding to the voltage difference between the gate voltage VG1 and the power supply voltage VDD.

The above-mentioned current I1 then flows into the resistor 162 through the transistor P10 to generate the first detection voltage VDT1 at one end of the resistor 162.

Assuming that the resistor 161 has a resistance Ra, the resistor 162 has a resistance Rb, voltage applied to the non-inverting input terminal (+) of the amplifier 163 is the power supply voltage VDD, and voltage applied to one end of the resistor 161 is the gate voltage VG1, the first detection voltage VDT1 is expressed by Equation (2) below.

$$VDT1=(Rb/Ra)(VG1-VDD) \qquad (2)$$

Here, the first detection voltage VDT1 is supplied proportionally to the voltage VGS1 between the gate and source of the discharging transistor 11 by the resistance ratio Rb/Ra.

The second voltage conversion circuit 7A has the same circuit configuration as the first voltage conversion circuit 6A and the operation of generation of the second detection voltage VDT2 is also the same as that of the first voltage conversion circuit 6A.

In the case where the first voltage conversion circuit 6A has the circuit configuration illustrated in FIG. 5, the reference voltage Vref applied to the gate of the transistor P3 in the comparison circuit 52 is generated from the power supply voltage VDD, but unlike the first embodiment, the voltage difference (VG1−VDD) is set as a constant voltage that exceeds the threshold voltage of the discharging transistor 11. Likewise, in the case where the second voltage conversion circuit 7A has the circuit configuration illustrated in FIG. 5, the voltage difference (VG2−VDD) is set as a constant voltage that exceeds the threshold voltage of the charging transistor 12.

Figure 6:
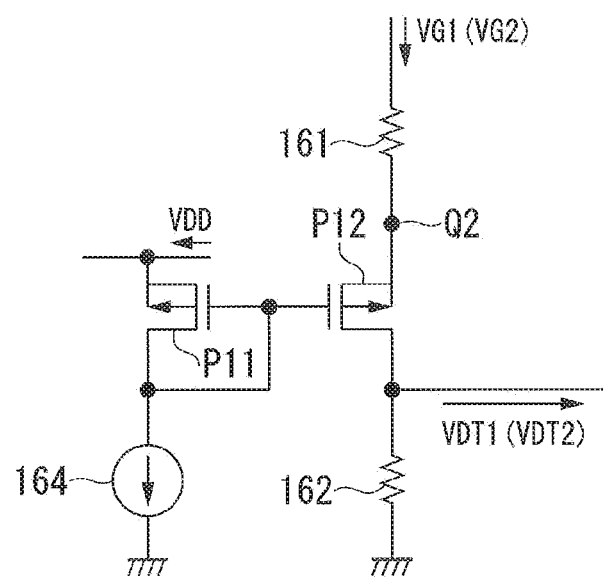
FIG. 6 is a circuit diagram illustrating a configurational example of a first voltage conversion circuit 6B in the second embodiment.

Instead of the first voltage conversion circuit 6A and the second voltage conversion circuit 7A having the circuit configuration illustrated in FIG. 5, a first voltage conversion circuit 6B and a second voltage conversion circuit 7B having a circuit configuration illustrated in FIG. 6 may be used as voltage conversion circuits.

FIG. 6 is a circuit diagram illustrating a configurational example of the first voltage conversion circuit 6B in the second embodiment. Note that the configuration of the second voltage conversion circuit 7B is the same as that of the first voltage conversion circuit 6B illustrated in FIG. 6.

The first voltage conversion circuit 6B includes a resistor 161, a resistor 162, transistors P11, P12, and a constant current source 164. The transistors P11 and P12 are p-channel MOS transistors.

The resistor 161 has one end connected to the signal line of the gate voltage VG1 and the other end connected to the source of the transistor P12 through a connection point Q2.

The resistor 162 has one end connected to the drain of the transistor P12 and the output terminal, and the other end connected to the power line of the power supply voltage VSS.

The transistor P11 has a source to which a predetermined voltage (for example, the power supply voltage VDD of the battery 20 or the voltage at the positive terminal of the connected device 30) is supplied, and gate and drain connected to the gate of the transistor P12 and an input terminal of the constant current source 164.

The constant current source 164 has an output terminal connected to the power line of the power supply voltage VSS.

Here, the voltage at the connection point Q2 can be made almost the same as the power supply voltage VDD by designing the transistor P11 and the transistor P12 to have the same size, and large W and L.

Thereby the current I1 corresponding to the voltage difference between the gate voltage VG1 and the power supply voltage VDD flows through the resistor 161. The above-mentioned current I1 then flows into the resistor 162 through the transistor P12 to generate the first detection voltage VDT1 at one end of the resistor 162.

Assuming that the resistor 161 has the resistance Ra, the resistor 162 has the resistance Rb, voltage applied to the source of the transistor P11 is the power supply voltage VDD, and voltage applied to one end of the resistor 161 is the gate voltage VG1, the first detection voltage VDT1 is expressed by Equation (2) as in the case of FIG. 5.

In the case where the first voltage conversion circuit 6B and the second voltage conversion circuit 7B have the circuit configuration illustrated in FIG. 6, the reference voltage Vref applied to the gate of the transistor P3 in the comparison circuit 52 is generated from the power supply voltage VDD like in the case of FIG. 5, but unlike in the first embodiment, the voltage difference (VG1−VDD) is set as a constant voltage that exceeds the threshold voltage of the discharging transistor 11.

As described above, according to the embodiment, the gate voltage VG1 of the discharging transistor 11 and the gate voltage VG2 of the charging transistor 12 can be always controlled to exceed the threshold voltage of the discharging transistor 11 and the charging transistor 12 regardless of the fluctuations of the power supply voltage VDD.

Third Embodiment

Figure 7:
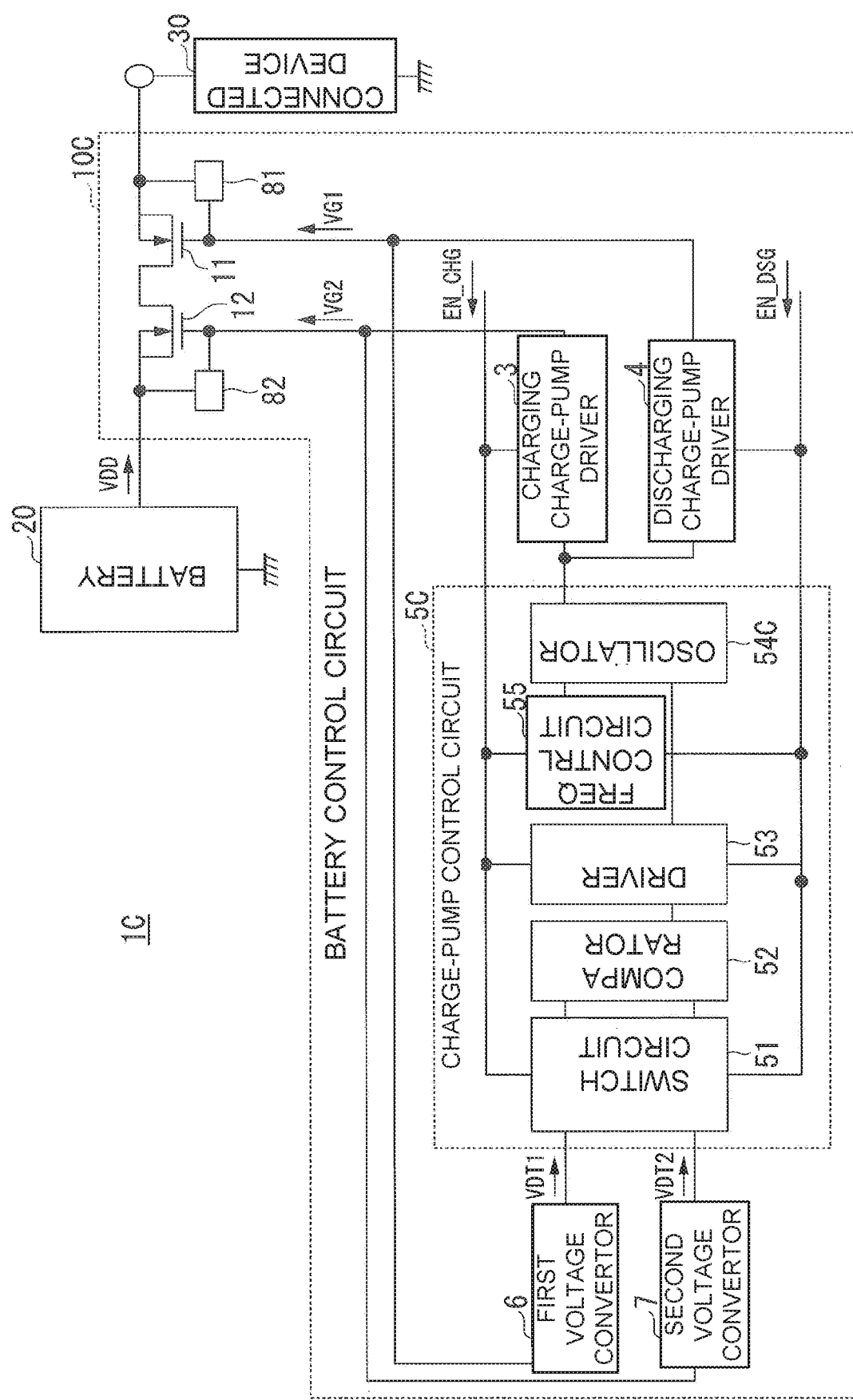
FIG. 7 is a schematic block diagram illustrating a configuration example of a battery device using a charge-pump control circuit according to a third embodiment.

FIG. 7 is a schematic block diagram illustrating a configurational example of a battery device using a charge-pump control circuit according to the third embodiment.

A battery device 1C includes a battery control circuit 10C instead of the battery control circuit 10 of the first embodiment. The battery control circuit 10C includes a charge-pump control circuit 5C instead of the charge-pump control circuit 5 of the first embodiment. Since the other components are the same as those in the battery device 1 of FIG. 1, the same reference numerals are given to the same components to omit redundant description appropriately.

The charge-pump control circuit 5C includes the switch circuit 51, the comparison circuit 52, the drive circuit 53, an oscillator 54C, and the frequency control circuit 55.

Upon transition from the disabled states to the enabled state of both the charge enable signal EN_CHG and the discharge enable signal EN_DSG or at least one of the charge enable signal EN_CHG and the discharge enable signal EN_DSG, the frequency control circuit 55 outputs a frequency control signal for high frequency state (for example, "H" level) during a predetermined time.

After the lapse of the predetermined time, the frequency control circuit 55 then shifts the frequency control signal to normal frequency state (for example, "L" level).

In the case where the drive signal is in drive state, the oscillator 54C outputs a clock of a frequency corresponding to the frequency control signal from the frequency control circuit 55. Here, in the case where the frequency control signal is in high frequency state, the oscillator 54C generates a clock of a frequency higher than (for example, more than twice) the frequency in normal frequency state.

The frequency in the normal frequency state is set so that each of the charging charge-pump driver 3 and the discharging charge-pump driver 4 can supply an enough gate current to maintain the gate voltage of each of the discharging transistor 11 and the charging transistor 12.

On the other hand, the frequency in the high frequency state is set so that each of the charging charge-pump driver 3 and the discharging charge-pump driver 4 can supply an enough gate current to boost the gate voltage of each of the discharging transistor 11 and the charging transistor 12 faster than (for example, twice as fast as) the case of the clock of the frequency in the normal frequency state.

Figure 8:
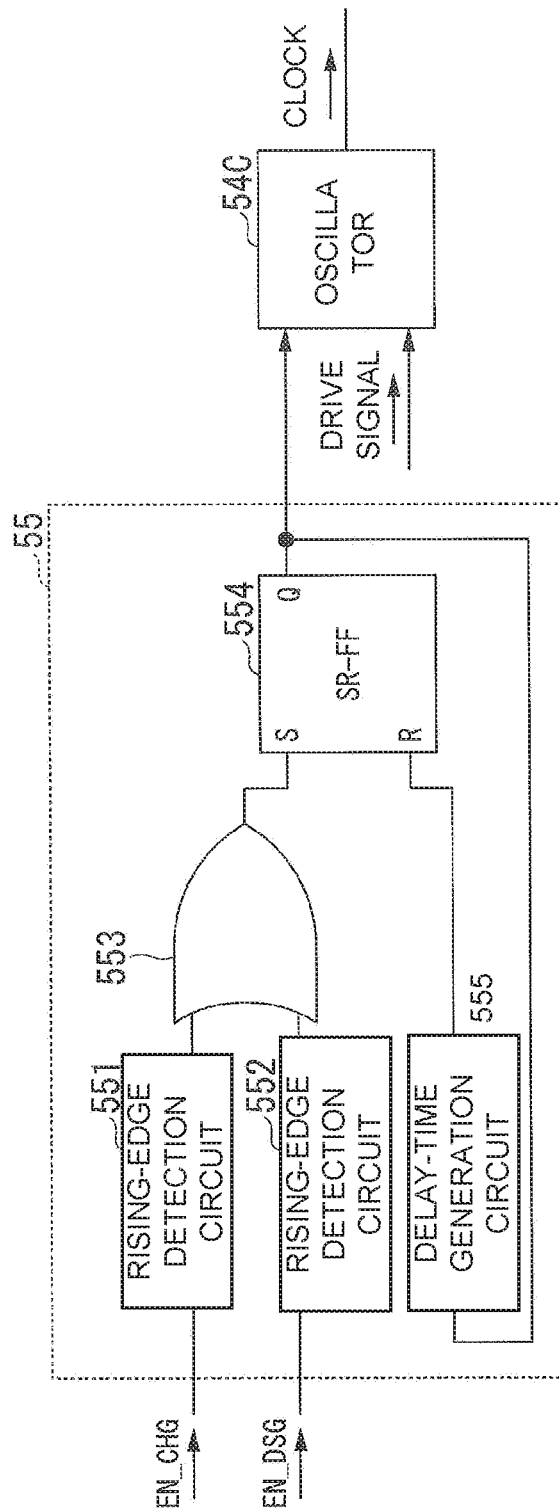
FIG. 8 is a block diagram illustrating a configuration example of an oscillator 54C and a frequency control circuit 55 in the third embodiment.
Figure 9:
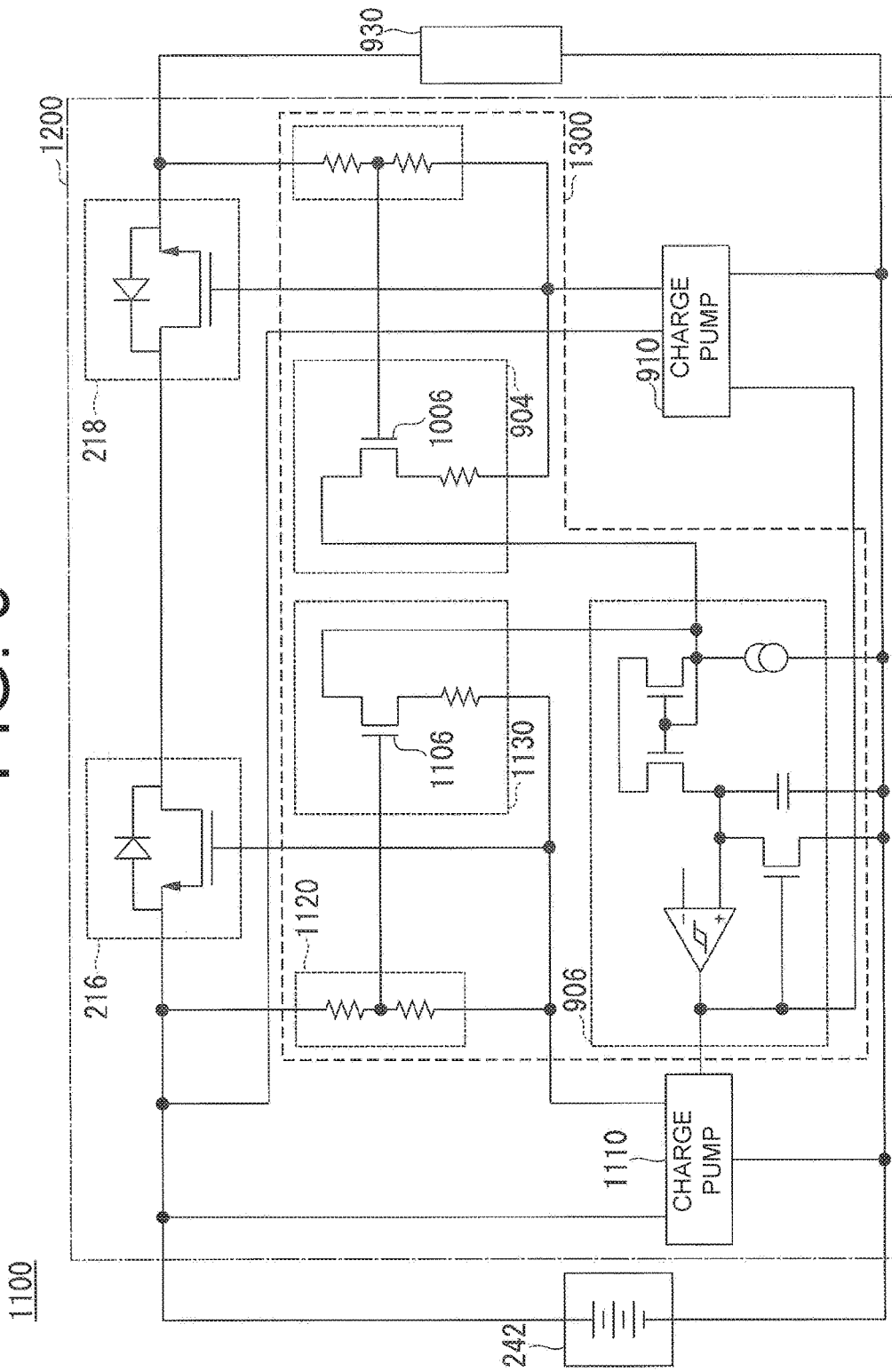
FIG. 9 is a circuit diagram illustrating a battery device including a conventional battery control circuit.

FIG. 8 is a block diagram illustrating a configurational example of the oscillator 54C and the frequency control circuit 55 in the third embodiment.

The frequency control circuit 55 includes rising edge detection circuits 551, 552, an OR circuit 553, an SR-flip flop 554, and a delay time generation circuit 555.

The rising edge detection circuit 551 detects a rising edge changing from "L" level (disabled state) of the charge enable signal EN_CHG to "H" level, generates the first set signal of a predetermined time, and outputs the first set signal to the OR circuit 553.

The rising edge detection circuit 552 detects a rising edge changing from "L" level (disabled state) of the discharge enable signal EN_DSG to "H" level, generates the second set signal of a predetermined time, and outputs the second set signal to the OR circuit 553.

In the case where either of the first set signal and the second set signal is supplied, the OR circuit 553 supplies the set signal to a set terminal S of the SR-flip flop 554.

In response to the supply of the set signal to the set terminal S, for example, the SR-flip flop 554 shifts the frequency control signal which is supplied from an output terminal Q from "L" level (normal frequency state) to "H" level (high frequency state).

After the lapse of the predetermined delay time after the frequency control signal supplied from the SR-flip flop 554 changes from "L" level to "H" level, the delay time generation circuit 555 supplies the reset signal to the reset terminal R of the SR-flip flop 554.

In response to the supply of the reset signal to the reset terminal R, the SR-flip flop 554 shifts the frequency control signal which is supplied from the output terminal Q from "H" level to "L" level.

The delay time generation circuit 555 stops the supply of the reset signal after the frequency control signal shifts from "H" level to "L" level.

As described above, according to the third embodiment, since the frequency control circuit 55 is provided to increase the clock frequency, for example, at startup, the clock frequency in the normal frequency state can be lowered, enabling a power saving mode.

The delay time generation circuit 555 may have a configuration which outputs, to the reset terminal of the SR-flip flop 554, a reset signal having a predetermined pulse width at the time point when the frequency control signal supplied from the SR-flip flop 554 changes from "L" level to "H" level.

Further, instead of the first voltage conversion circuit 6 and the second voltage conversion circuit 7, the first voltage conversion circuit 6A and the second voltage conversion circuit 7A, or the first voltage conversion circuit 6B and the second voltage conversion circuit 7B in the second embodiment may be used.

While the embodiments of this invention have been described in detail, the present invention is not limited to the embodiments, and design changes and the like without departing from the gist of this invention are also included.

What is claimed is:

1. A charge-pump control circuit comprising:
a first charge pump driver configured to supply a first gate voltage to a discharging transistor in order to control discharging from a battery;
a second charge pump driver configured to supply a second gate voltage to a charging transistor in order to control charging to the battery;
an oscillator configured to supply a clock for driving the first charge pump driver and the second charge pump driver, respectively;
a drive control circuit configured to set a control target voltage as whichever of the first gate voltage and the second gate voltage having a lower voltage and control generation of the clock by the oscillator according to the control target voltage; and
a switch circuit configured to output a first comparison voltage indicative of the first gate voltage of the discharging transistor after switching to one of a detection voltage corresponding to the first gate voltage and a power supply voltage according to a discharge enable signal to control the discharge of the battery, and output a second comparison voltage indicative of the second gate voltage of the charging transistor after switching to one of a detection voltage corresponding to the second gate voltage and the power supply voltage according to a charge enable signal to control the charge of the battery.

2. The charge-pump control circuit according to claim 1, wherein the drive control circuit causes the oscillator to generate the clock in a case where either or both of the discharge enable signal and the charge enable signal indicate an enabled state, and the control target voltage is less than a predetermined set voltage.

3. The charge-pump control circuit according to claim 1, further comprising
a frequency control circuit configured to increase a frequency of the clock of the oscillator upon lapse of a predetermined time after at least either of the discharge enable signal and the charge enable signal is put in the enabled state.

4. A battery control circuit comprising:
a discharging transistor configured to control discharging from a battery;
a charging transistor configured to control charging to the battery;
a first voltage conversion circuit configured to acquire a first gate voltage of the discharging transistor as a first detection voltage corresponding to the first gate voltage;
a second voltage conversion circuit configured to acquire a second gate voltage of the charging transistor as a second detection voltage corresponding to the second gate voltage;
a discharging charge-pump driver configured to supply the first gate voltage to the discharging transistor;
a charging charge-pump driver configured to supply the second gate voltage to the charging transistor;
an oscillator configured to supply a clock for driving each of the discharging charge-pump driver and the charging charge-pump driver; and
a drive control circuit configured to set a control target voltage as whichever of the first gate voltage and the second gate voltage having a lower voltage and controls generation of the clock by the oscillator according to the control target voltage.

* * * * *